(12) United States Patent
Pollman

(10) Patent No.: US 7,594,868 B1
(45) Date of Patent: Sep. 29, 2009

(54) SPLIT-POWER TRANSMISSION WITH MODE SHIFT

(75) Inventor: Frederic W. Pollman, Eden Prairie, MN (US)

(73) Assignee: Sauer-Danfoss Inc., Ames, IA (US)

( * ) Notice: Subject to any disclaimer, the term of this patent is extended or adjusted under 35 U.S.C. 154(b) by 410 days.

(21) Appl. No.: 11/467,398

(22) Filed: Aug. 25, 2006

(51) Int. Cl.
*F16H 3/72* (2006.01)

(52) U.S. Cl. .......................................... 475/5; 475/149

(58) Field of Classification Search ...... 475/5, 475/149, 150
See application file for complete search history.

(56) References Cited

U.S. PATENT DOCUMENTS

| | | | |
|---|---|---|---|
| 4,750,381 A | 6/1988 | Kita et al. | |
| 4,754,664 A | 7/1988 | Dick | |
| 4,813,306 A | 3/1989 | Kita et al. | |
| 5,632,703 A | 5/1997 | Wilkes et al. | |
| 5,667,452 A | 9/1997 | Coutant | |
| 5,931,758 A | 8/1999 | Walter | |
| 5,935,035 A | 8/1999 | Schmidt | |
| 6,010,422 A | 1/2000 | Garnett et al. | |
| 6,106,427 A | 8/2000 | Nikolaus et al. | |
| 6,251,037 B1 * | 6/2001 | Baumgaertner et al. | 475/2 |
| 6,371,878 B1 | 4/2002 | Bowen | |
| 6,440,026 B1 | 8/2002 | Johnson et al. | |
| 6,455,947 B1 | 9/2002 | Lilley et al. | |
| 6,551,208 B1 | 4/2003 | Holmes et al. | |
| 6,592,484 B1 | 7/2003 | Tsai et al. | |
| 6,729,985 B2 | 5/2004 | Crewe et al. | |
| 6,962,545 B2 | 11/2005 | Larkin | |
| 7,192,373 B2 * | 3/2007 | Bucknor et al. | 475/5 |
| 7,306,534 B2 * | 12/2007 | Bucknor et al. | 475/5 |
| 7,367,910 B2 * | 5/2008 | Schmidt | 475/5 |
| 2006/0019785 A1 | 1/2006 | Holmes et al. | |
| 2006/0025259 A1 | 2/2006 | Klemen et al. | |
| 2007/0149334 A1 * | 6/2007 | Holmes et al. | 475/5 |

* cited by examiner

*Primary Examiner*—Ha D. Ho

(57) ABSTRACT

An operating system for a vehicle having an engine that provides an input shaft into a split-power transmission to actuate an output shaft that drives an axle and wheels of the vehicle. The split-power transmission uses a power summing device in order to provide a plurality of modes that are associated with a plurality of clutching and variable power units. By using the power summing device in association with the plurality of clutches and variable power units, a controller that is electrically connected to each is able to actuate the clutches and variable power units in order to provide an automatic transmission that shifts at synchronous speeds.

19 Claims, 10 Drawing Sheets

SPLIT-POWER TRANSMISSION WITH MODE SHIFT

BACKGROUND OF THE INVENTION

This invention is related to vehicle transmissions. More specifically, this invention relates to a split-power transmission with automatic mode shifts.

There are a number of vehicles that desire to have "automatic" transmission for ease of driving and for increased utility. These include various construction vehicles, tractors, utility vehicles, recreational vehicles and automobiles. These vehicles have common requirements for low cost, high efficiency, good control ability and continuous ratio change throughout the entire speed range. Some of these vehicles have a requirement for low noise. Many vehicles have a small battery that is only used for starting and emergency use.

Split-power transmissions are characterized by a continuously variable transmission power path in parallel with a fixed mechanical power path, arranged in a manner to decrease the average power flow through the variable portion and thereby increase operating efficiency. Typically, the mechanical power path includes a planetary gear set which acts to sum the power flow at either the input or output end of the transmission.

Multi mode split-power transmissions are usually accomplished by reusing the variable power units and clutching to a different mechanical component. Usually the modes are arranged so that there is no ratio change during the mode change in order to have continuous speed or torque delivery. This is accomplished by making the mode shifts at a near synchronous speed conditioned for the incoming clutch.

Variable power units within a multi mode split-power transmission are normally operated up to near to their full speed range including both forward and reverse directions. For a pair of variable power units, the unit that decreases speed relative to the other unit absorbs power (a generator or pump), and the unit that increases speed relative to the other delivers power (a motor). When one of the units changes direction of rotation, the direction of power flow also changes. This does not necessarily result in any interruption of power in the transmission or any speed shift in the variable power units as the direction of torque may not change.

When changing modes the variable power units could reverse the direction of power flow if the direction of torque changes. This may be observed by the variable power units reversing the relative rate of speed change; i.e., if one unit was increasing speed (relative to the other) before mode change as output speed increased, and decreasing relative speed after mode change, the direction of torque has to change in order to delivery power. The same is true if one unit was decreasing speed relative to the other and then increased after mode change. A power unit torque reversal normally happens after during a mode change for a split-power transmission as the mechanical elements that are changed with clutches remain in the same functional relationship, i.e., the variable power units remain in an input summer or an output summer relationship. A torque direction change in the variable power units may require a stepped shift in speed differential between them in order to account for a reversal and slip in a closed circuit system.

Therefore, it is a principal object of the present invention to provide a split-power transmission within a vehicle that provides automatic mode shifts.

Yet another object of the present invention is to provide a light weight and compact split-power transmission for a vehicle.

These and other objects, features or advantages of the present invention will become apparent from the specification and claims.

BRIEF SUMMARY OF THE INVENTION

A vehicle having a split-powered transmission that is mechanically connected to an engine to actuate the axle and wheels of the vehicle. The split-power transmission has a power summing device that is used in association with a plurality of clutch elements that determine the connection and power pathway between the power summing device and a plurality of variable power units. Thus, a controller can be electrically connected to the power summing device, plurality of clutches and plurality of variable power units in order to actuate the clutches to place the transmission in a plurality of operational modes.

DETAILED DESCRIPTION OF THE PREFERRED EMBODIMENT

Figure 1:
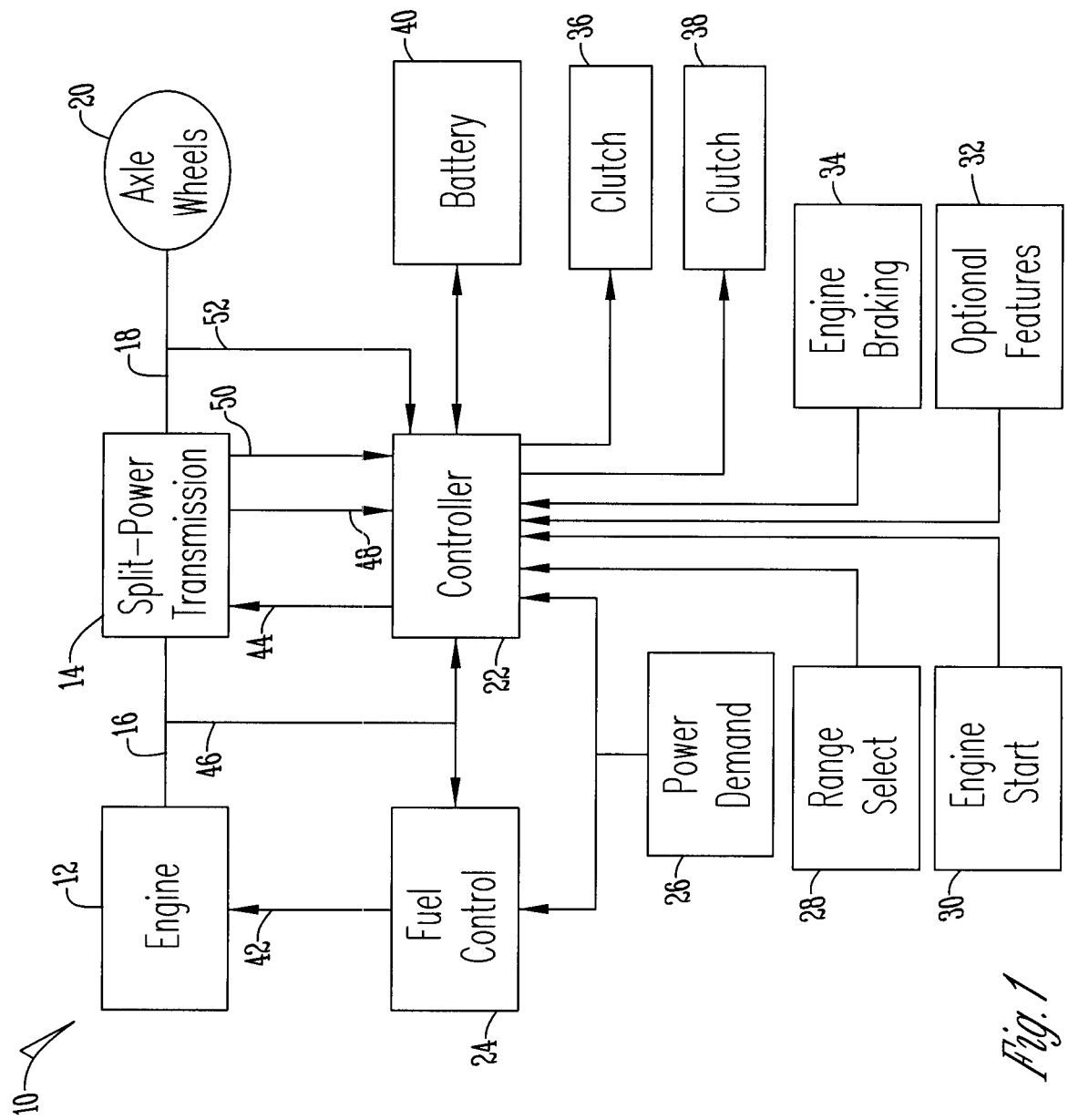
FIG. 1 is a schematic diagram of a vehicle system having a split-power transmission.

FIG. 1 shows a vehicle system 10 having an engine 12 that is mechanically connected to a split-power transmission (SPT) 14 with a drive line 16 that represents an input shaft of the split-power transmission 14. The split-power transmission 14 has a continuously variable ratio from full reverse speed to maximum forward speed. This allows the engine 12 to be connected to the split-power transmission 14 without a clutch and allows full control of the transmission to achieve optimum power delivery, maximized fuel economy, obtain cruise control and a number of other vehicle performance enhancing features.

Additionally, the split-power transmission 14 has an output shaft 18 that mechanically connects the split-power transmission 14 to axle/wheels 20. Electrically connected to the split-power transmission 14 is a controller 22 that is additionally electrically connected to a fuel control device 24, a power demand device 26 a range select device 28, an engine start device 30, optional devices 32, engine braking device 34, first and second mode change clutches 36 and 38, battery 40 and input and output shafts 16 and 18. Though shown with only first and second mode change clutches 36 and 38, additional clutches can be used.

By being electrically connected to the components listed the controller 22 is able to perform a plurality of functions. For example, the controller 22 operates the fuel control device 24 to send a fuel signal 42 to the engine 12. Additionally, the controller can send current 44 to the split-power transmission 14. Other signals and readings received include an input speed signal 46 from the input shaft 16, voltage 48 measured internally within the controller 22, a rotor position signal 50 from the split-power transmission 14 and an output speed signal 52 from the output shaft 18. The controller 22 also sends and receives other signals from the all of the components discussed above.

Figure 2:
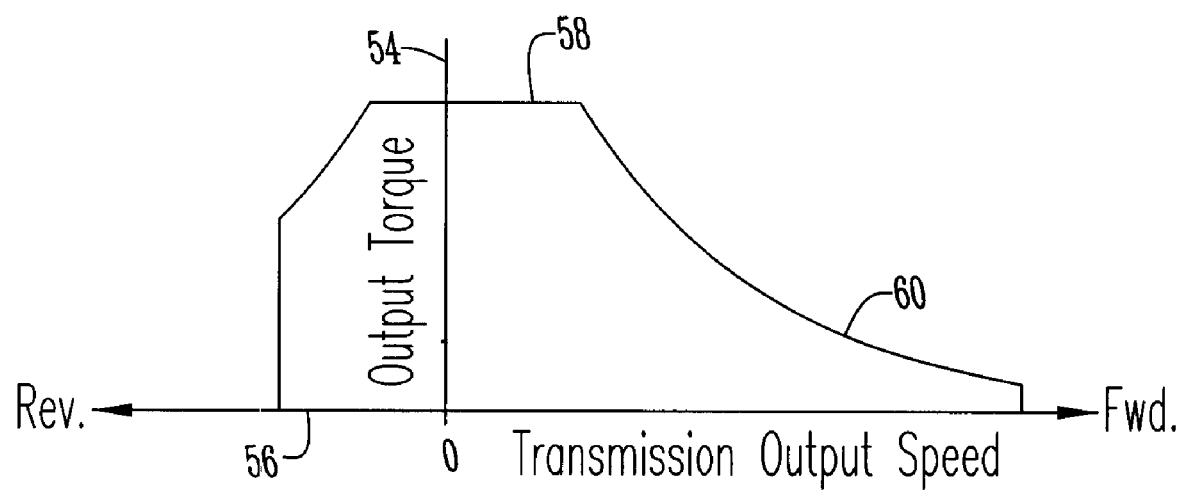
FIG. 2 is a graph of transmission output torque versus transmission output speed in a transmission.

Typical vehicle performance of this system 10 is shown in FIG. 2. In FIG. 2 the transmission output torque 54 is on the vertical axis and output speed 56 is on the horizontal axis. The maximum torque limit 58 occurs near zero speed. Above this speed, the torque is limited by engine power on line 60. For a two forward mode transmission, mode change would occur at approximately 25%-40% of output speed, depending on the particular gear scheme. Maximum reverse speed is in the range of approximately 25%-50% of maximum forward speed, depending on the vehicle.

Figure 3:
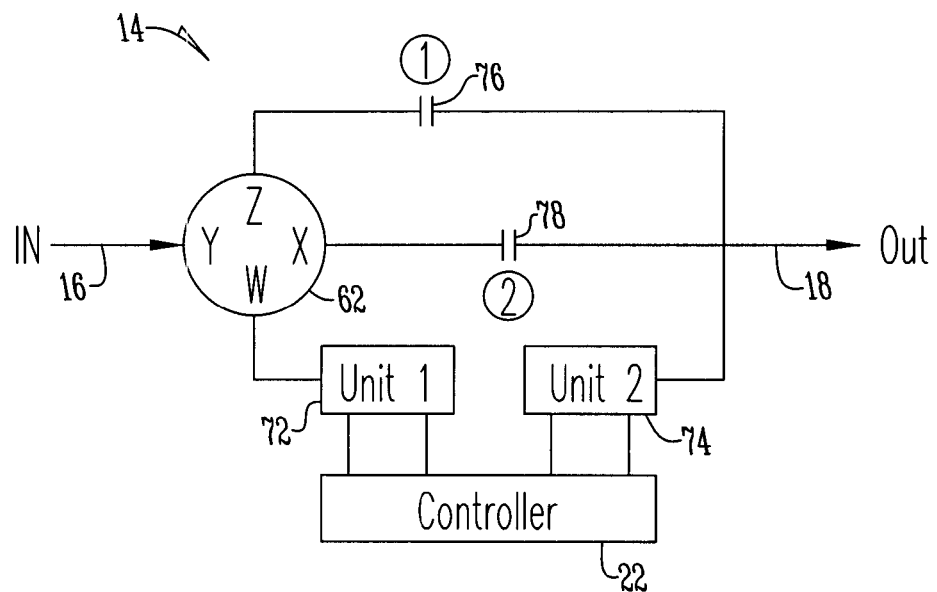
FIG. 3 is a schematic block diagram of a split-power transmission.

FIG. 3 shows one embodiment of a split power transmission 14. In this embodiment the drive line or input shaft 16 is mechanically connected to a gear planetary 62. The gear planetary 62 has first, second, third and fourth elements 62W, 62X, 62Y and 62Z. The split-power transmission 14 additionally has first and second variable power units 72 and 74 that are electrically connected to the controller 22. The variable power unit speeds may be calculated by the controller 22 if the input and output speeds are known along with the mode range. Additionally, first and second variable power units 72 and 74 in one embodiment are electrical motor generators whereas in another embodiment they are hydraulic pump motors. The controller 22 is also electrically connected to first and second clutches 76 and 78 within the split-power transmission 14.

In the embodiment shown in FIG. 3 the input shaft 16 is mechanically connected within the third element 62Y of gear planetary 62 while the first element 62W is connected to the first variable power unit 72. When the first clutch 76 is engaged, the fourth element 62Z connects with the second variable power unit 74. Meanwhile, when the second clutch 78 is engaged the second element 62X is mechanically connected to the output shaft 18.

Therefore, engine power enters the transmission at drive line or input 16 only at third summer element 62Y, thus defining an input summer. Consequently, when the first clutch 78 is engaged, the split-power transmission is considered in a first mode wherein the first clutch 76 connects output shaft 18 and variable power unit 74 to the fourth summer element 62Z. Meanwhile, in a second mode the second clutch 78 is engaged to connect second summer element 62X to the output shaft 18 and variable power unit 74.

In an embodiment wherein the first and second variable power units 72 and 74 are motor generator units, in order to control transmission ratio and engine power delivery, the control 72 sets current 44 in the motor generator units 72 and 74. The controller 72 additionally sets the direction of current 44 to control the variable power units 72 and 74 rotational direction and whether each unit 72 and 74 function as a motor or generator.

Thus, the controller 22 functions automatically to regulate transmission ratio in response to programmed instructions and the operator commands. As a bi-product the controller 22 may also regulate engine speed, output speed, output torque, fuel delivery, and vehicle acceleration or deceleration. The controller 22 also qualifies and then makes mode shifts, keeps the battery 40 charged, and starts the engine 12 with one of the motor generator units 72 or 74. Additionally, these control functions can reside in more than one physical control unit 22 and the controller 22 can be electrical and may contain digital logic.

Figure 4:
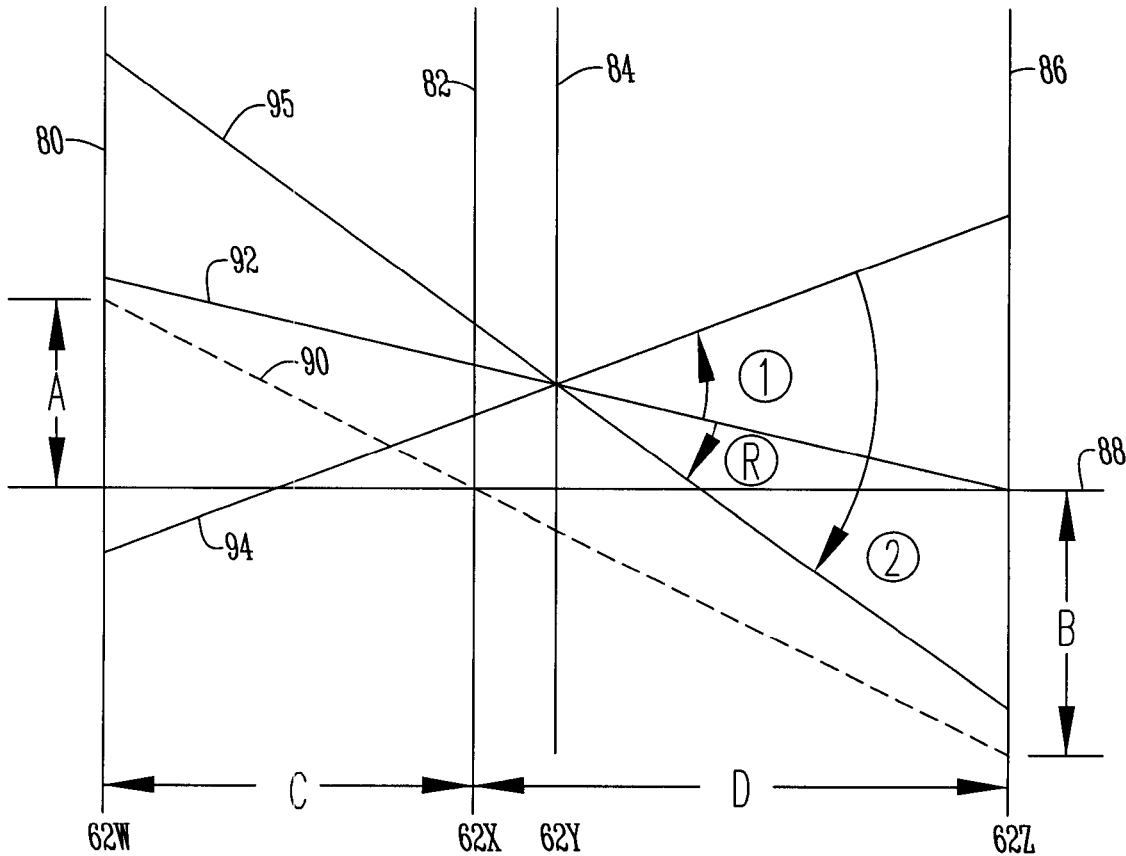
FIG. 4 is a speed diagram for a gear planetary within a split-power transmission where the vertical axial axis represents speed and the horizontal axis represents planetary ratio.

In FIG. 4 a speed diagram for gear planetary 62 is shown. The speed diagram is a graphical illustration of the speed relationships for all the elements of the gear planetary 62. In FIG. 4 the vertical axes 80, 82, 84, 86 represent speed and the horizontal axis 88 is planetary ratio. The length between the vertical axes lines 80, 82, 84, 86 represents the ratio of the planetary gears. For example, if axis 80 representing first element 62W is a ring gear, axis 82 for second element 62X, a carrier, and axis 86 for fourth element 62Z a sun, then the ratio D-C represents the ratio of ring teeth to sun teeth. If the speed of second element 62X was zero and the ratio D-C is −2, and the ratio B-A would be −2 as shown with line 90. Thus, sun speed would be twice the ring speed and in the opposite direction.

For the split-power transmission 14 shown in FIG. 3 the first mode starts with fourth element 62Z at zero speed as shown by line 92 intersecting zero speed at axis 86. Element 62Y is at input speed as shown by line 92 at axis 84. When controller 22 causes the variable power units 72 and 74 to change, the ratio of the split-power transmission 14 can drive forward, fourth element 62Z speeds up and element 62X slows down and goes negative as shown by line 94 at axis 80. At this speed condition, the second mode is engaged with the second clutch 78 by changing output shaft 18 and second variable power unit 74 from fourth element 62Z to second element 62X. This includes a ratio change at second variable power unit 74/output shaft 18 to achieve synchronous speed shifts. This allows a further increase in output speed up to line 95 at axis 82 by reversing the speed change of the first variable power unit 72. Maximum reverse speed is also line 95 but is at axis 86 with first clutch 76 engaged in the first mode.

The particular gear scheme required would depend on the design of the first and second variable power units 72 and 74. The gear scheme would also depend on the design of the input shaft 16 and the output shaft 18 spatial configuration.

Figure 5:
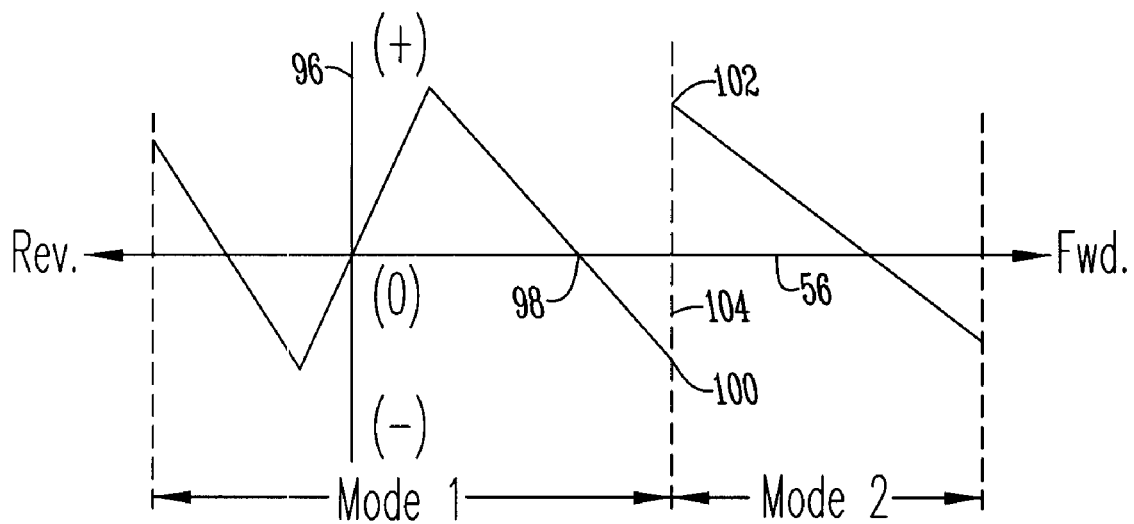
FIG. 5 is a power graph of a split-power transmission wherein the Y axis shows variable power for variable power units and output speed is on the horizontal axis.

FIG. 5 shows a graph of variable power for first and second variable power units 72 and 74 of the split-power transmission 14 shown in FIG. 3 shown on an axis 96. Meanwhile, the horizontal axis is represented with the same output speed 56 as shown in FIG. 2. In operation, starting forward from zero speed, first variable power unit 72 acts as a generator or pump supplying power to second variable power unit 74. Positive power flows from unit 72 to unit 74 in the direction of engine power delivery. Power is also delivered to output shaft 18 by planetary 62 through first clutch 76 and is additive to the second variable power unit 74 power. As output shaft 18 speeds up, unit 72 slows down and reverses direction. This is shown as point 98 in FIG. 4. Near zero speed for unit 72, unit 74 becomes a generator or pump and beyond zero speed unit 72 becomes a motor. With unit 72 at a negative speed, power flows in the opposite direction of the engine and recirculates through planetary summer 62. This is shown as negative power between point 98 and point 100 of FIG. 5. Thus point 100 represents the shift point between the first and second modes.

The gear arrangement provides for near synchronous speed of second clutch 78 at the shift point 100 producing no ratio change in the split-power transmission 14. After shift, unit 72 speed becomes less negative and then increases positively as the output speeds up. Unit 74 continues to increase speed as output speed increases. After shift, the units 72 and 74 reverse their direction of power flow as unit 72 again becomes a generator or a pump and unit 74 a motor as graphically shown in FIG. 5 from point 100 to point 102.

Figure 6:
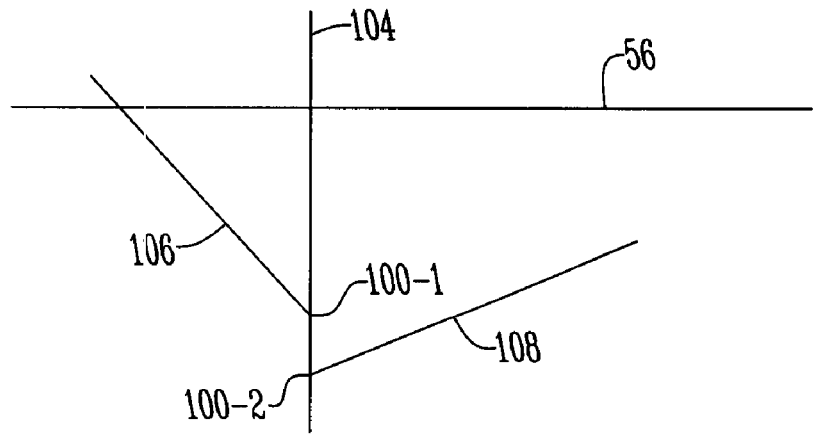
FIG. 6 is a speed graph wherein the horizontal axis shows output speed and the vertical axis shows unit speed.

Because of the electrical slip when delivering power, a variable power unit, for example a generator, may need to operate faster than a motor if the generator is sized similarly. Because a battery 40 is not large enough to supply the needed transmission power, unit 72 may be required to make a speed increase during the shift in order to maintain continuous power delivery. This may be done by making a pre synchronous shift by using second clutch 78 to effect the speed change. On FIG. 6, line 104 is at the shift speed. The speed of unit 72 before shift is represented by line 106 and the speed of the unit 72 after the shift is represented by line 108. When the second clutch 78 is engaged pre-synchronously, a speed shift from point 100-1 to point 100-2 occurs that allows unit 72 to change from a motor to a generator and deliver continuous power. This enables first and second variable power units 72 and 74 to remain in a closed circuit without external power or exceeding voltage or current limits. As electrical motor generators have a relatively large inertia for the amount of power delivered, a high energy, multiple disc clutch may be required.

Reverse speed is achieved by reversing the direction of current to unit 72 with controller 22 when first clutch 76 is engaged. This causes the output to rotate in the opposite direction. Unit 72 is a generator or pump and unit 74 is a motor turning in the opposite direction from that in forward. Continuous power is delivered from the engine to the wheels with continuous ratio change, from full reverse to full forward speed even though the transmission changes modes between zero and maximum speed.

For down shifts, the process is reversed and shifts would be post synchronous, on the low speed side of synchronous. If braking, the power flow in the variable power units 72 and 74 is reversed and the shifts take place on the opposite side of synchronous as for driving. Controller 22 may integrate engine braking with mechanical service brakes.

The engine starting function is accomplished by mechanically blocking rotation of either of the first or second clutches 76 or 78 and supplying electrical power through controller 22 to unit 72. The battery charging function is accomplished by bleeding electrical power from the unit 72 or 74 that is acting as a generator through controller 22. Transmission control functions are accomplished in a manner similar to that in U.S. Pat. No. 5,560,203 that is incorporated herein, except that variable power unit current is controlled instead of unit displacement. Shift points are made based on unit 72 and 74 speed and power delivery, both of which are sensed by controller 22.

Figure 7:
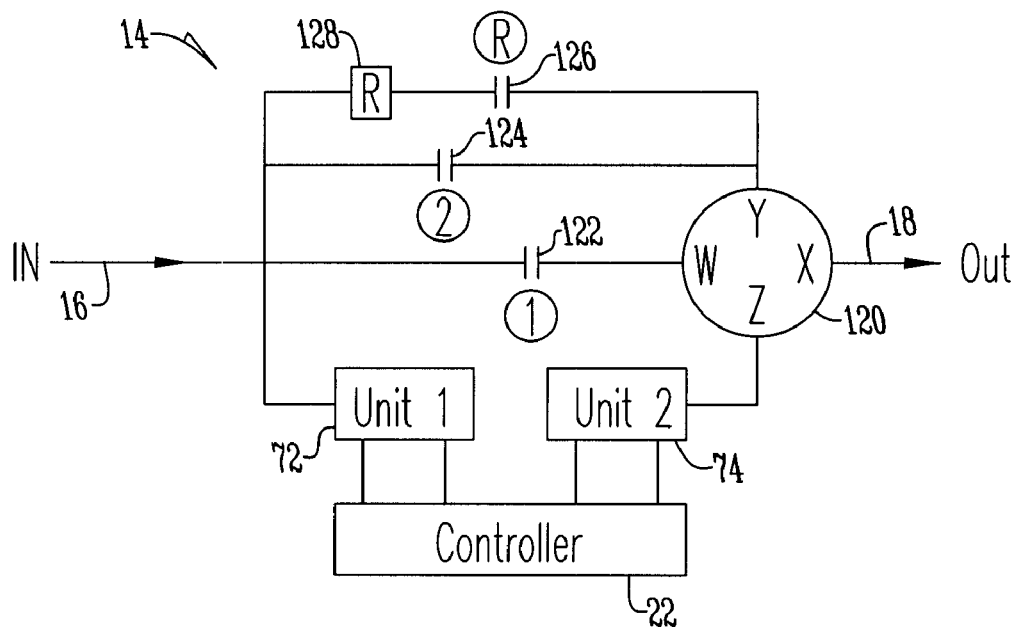
FIG. 7 is a schematic block diagram of a three mode split-power transmission.

FIG. 7 shows an alternative embodiment of a split-power transmission 14 wherein the split-power transmission 14 has three modes with an output power summer 120 having first, second, third and fourth output power summer elements 120W, 120X, 120Y, and 120Z. The output power summer 120, in one embodiment, is a gear planetary that works in association with the input shaft 16, first and second variable units 72 and 74, and controller 22 to produce an output speed upon output shaft 18.

Specifically, the output summer 120 works in association with first, second and third clutch elements 122, 124, and 126 and reversing gear 128 to provide the output speed. Engine power enters the transmission 14 at drive line or input shaft 16 and splits between variable power unit 72 and either first, second or third clutch elements 122, 124, and 126. Output shaft 18 is connected only to summer second element 120X, thus the defining an output summer. Additionally, variable power unit 74 is connected to fourth summer element 120Z.

In a first mode, the first clutch element 122 connects the input shaft 16 to the first summer element 120W. In a second mode the second clutch element 124 connects the third summer element 120Y to the input shaft 16 wherein reverse is achieved by connecting the second summer element 23Y to input shaft 16 through the reversing gear 128.

Figure 8:
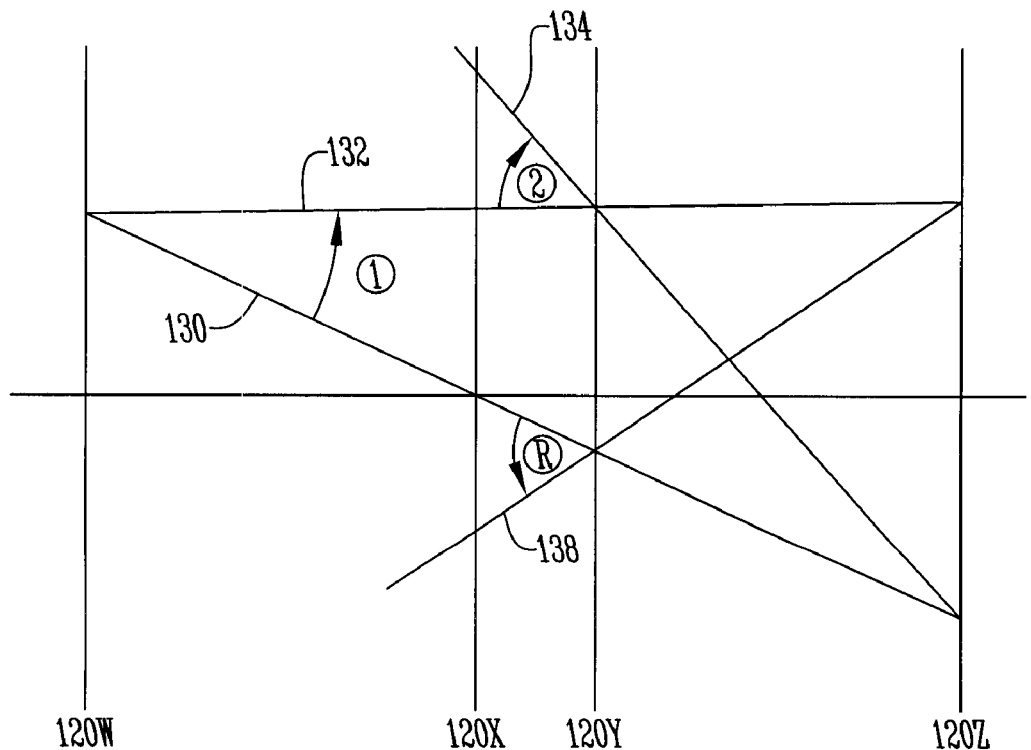
FIG. 8 is a speed diagram of a three mode split-power transmission wherein the vertical axis is speed and the horizontal axis is planetary ratio.

The speed diagram for the split-power transmission 14 of FIG. 7 is shown in FIG. 8. As shown by line 130, the first mode starts with element 120X at zero speed wherein element 120W is at the input shaft speed and element 120Z is at a negative speed. When controller 22 causes units 72 and 74 to change the ratio of the split-power transmission 14 to drive the vehicle forward element 120Z reduces its negative speed and then increases speed positively causing element 120X to increase in speed. As shown by line 132, a complete speed direction change of element 120Z raises element 120Y to near input shaft speed. By engaging the second clutch element 124 the transmission 14 is placed in a second mode at line 132 by changing the input shaft 16 connection from element 120W to element 120Y, including a ratio change if necessary to achieve near synchronous speed shifts. This allows a further increase in output speed up to line 134 by reversing the speed change of unit 74 and element 120Z. Maximum reverse speed shown by line 138 wherein the third clutch element, or reverse mode clutch 126 is engaged.

Again, similar to the transmission 14 of FIG. 3 the particular gear scheme required for the transmission 14 of FIG. 7 would depend on the design of the first and second variable power units 72 and 74. The gear scheme would also depend on the design of the input shaft 16 and the output shaft 18 spatial configuration.

Figure 9:
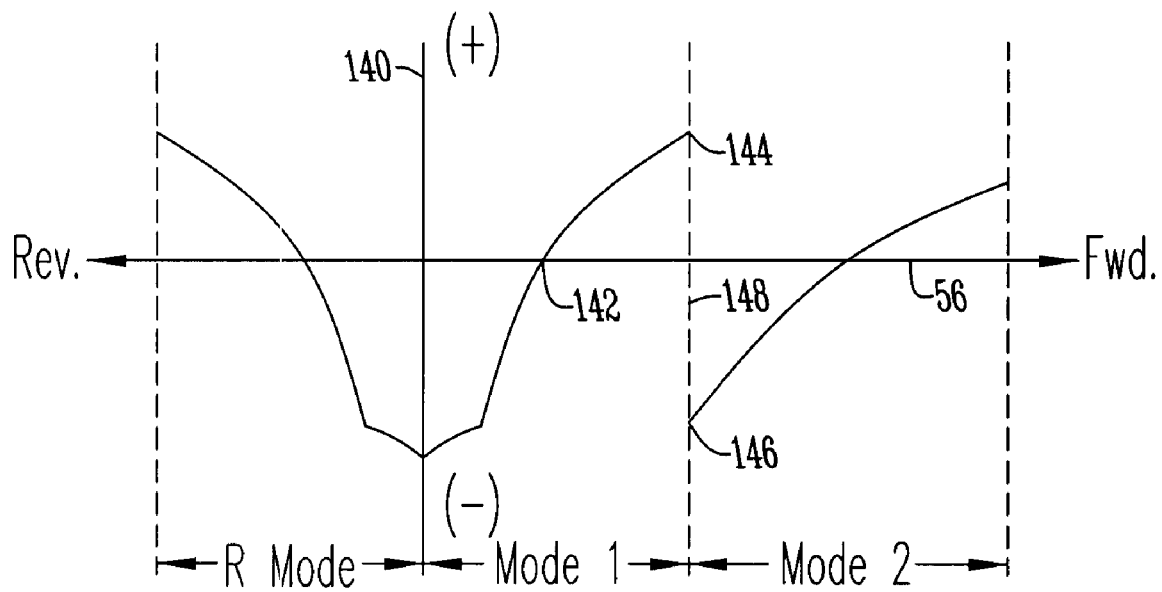
FIG. 9 is a graph of a three mode split-power transmission wherein the horizontal axis is output speed and the vertical axis shows transmitted power of variable power units.

FIG. 9 shows transmitted power for units 72 and 74 for split-power transmission of FIG. 7 wherein power 140 is shown on the vertical axis and output speed 56 on the horizontal axis. The output speed 56 of FIG. 9 is identical to the output speed 56 shown in FIG. 2. In operation, when starting forward from zero speed, unit 74 acts as generator or pump that supplies power to unit 72. Negative, recirculating power flows from unit 74 to unit 72, opposite the direction of engine power delivery. This power plus power from the engine 12 is delivered to summer 120 through first clutch element 122 and split to output shaft 18. As the output shaft 18 speeds up, unit 74 slows down and reverses direction. This is shown as point 142 in FIG. 9. Near zero speed for unit 74, unit 72 becomes a generator or pump and beyond zero speed unit 74 becomes a motor. With unit 74 at positive speed, power flows in the same direction of the engine. This is shown as positive power between points 142 and 144. Thus, point 144 is considered the shift point between the first and second modes.

The gear arrangement provides for near synchronous speed of second clutch element 124 at the shift point 144, producing no ratio change in split-power transmission 14. After the shift, the speed of unit 74 reduces and then increases negatively as the output shaft increases speed. Unit 74 continues to increase speed negatively as the output shaft speed increases.

After the shift, the units 72 and 74 reverse their direction of power flow causing unit 74 again to become a generator or pump and unit 72 a motor. This is shown graphically in FIG. 9 as a shift in power from point 144 to point 146. As with the split-power transmission of FIG. 3, a pre-synchronous shift is made using the second clutch element 124 to effect this speed change.

Figure 10:
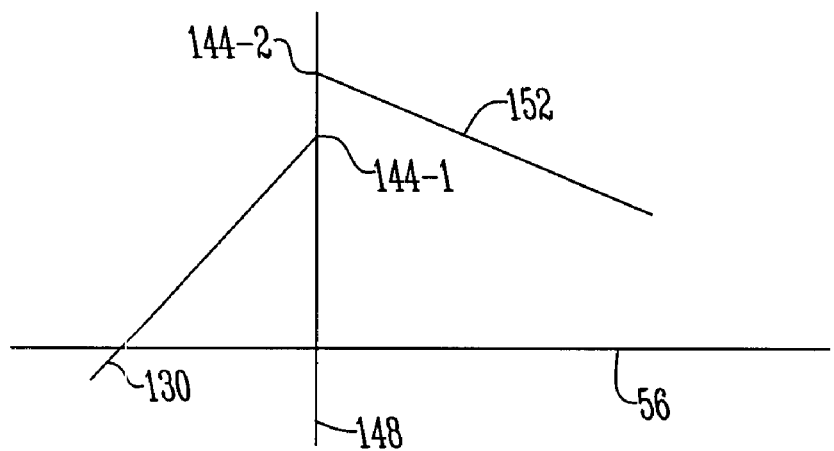
FIG. 10 is a graph of the speed of a three mode split-power transmission wherein the horizontal axis is output speed and the vertical axis represents unit speed.

As shown in FIG. 10, line 148 is at the shift speed. The speed of unit 74 before shift is represented by line 150, and the speed of unit 74 after shift is represented by line 152. When second clutch element 124 is engaged pre-synchronously, a speed shift from point 144-1 to 144-2 occurs that allows unit 74 to change from a motor to a generator. This enables units 72 and 74 to remain in a closed circuit without external power and without exceeding voltage or current limits.

Reverse speed is achieved by engaging reverse mode clutch 126. This connects planetary element 120Y to input shaft 16 through the reversing gear 128. Unit 74 is a generator or pump and unit 18 is a motor, both turning in the same direction as that in forward mode. When making dynamic mode shifts from forward to reverse, most shifts occur transitioning from braking in forward to driving in reverse. This constitutes a power reversal in the variable power units and is accommodated with a pre-synchronous shift that occurs near zero output speed.

Continuous power is delivered from the engine to the wheels, with continuous ratio change, from full reverse to full forward speed even though the transmission changes modes between zero and maximum speed forward, and at zero speed for reverse. Other functions are accomplished as in discussed above regarding the split-power transmission of FIG. 3.

Figure 11:
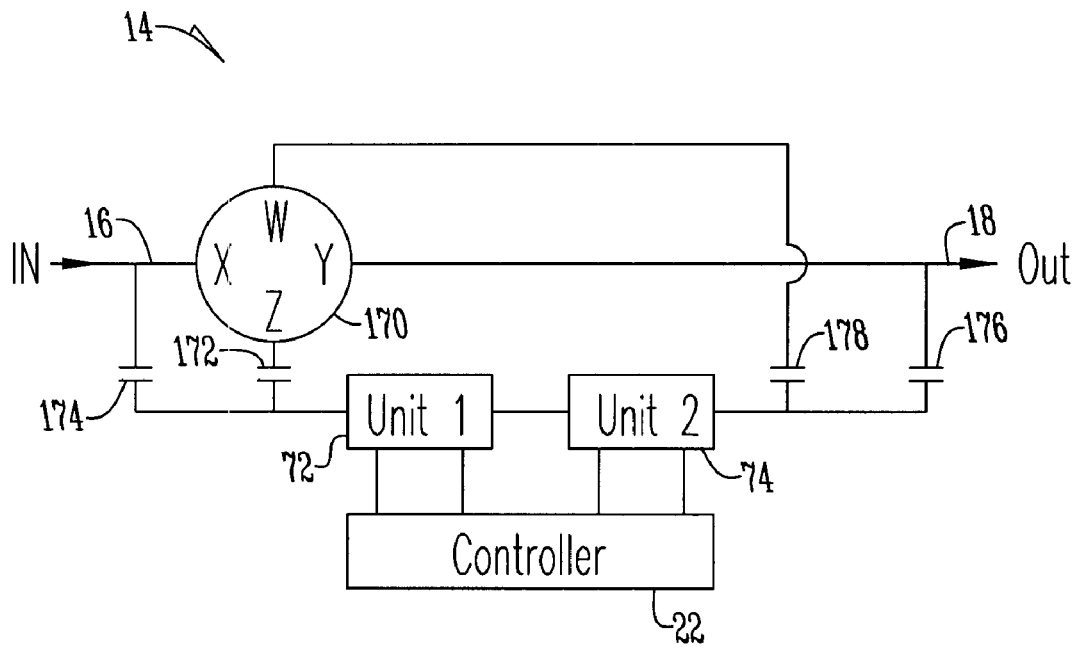
FIG. 11 is a block schematic diagram of a split-power transmission.

FIG. 11 shows a block diagram of an alternative embodiment of the split-power transmission 14. In this embodiment the split-power transmission 14 is a two mode split transmission with a power summer 170 that switches from an input summer to an output summer when changing from mode 1 to mode 2. In this embodiment the power summer 170 and the input shaft 16 work in association with first and second variable power transmission clutches 172 and 174 to engage the first variable power unit 72 and third and fourth variable power transmission clutches 176 and 178 to connect the second variable power unit 74 to the power summer 170 and output shaft 18. As with the previous embodiments, the power summer 170 in a preferred embodiment is a gear planetary having four gear planetary elements 170W, 170X, 170Y, and 170Z.

In a first mode engine power enters the transmission at input shaft 16 only at second summer element 170X in an input summer configuration. Variable power unit 72 is connected to fourth summer element 170Z with first clutch 172 and second variable power unit 74 is connected to the output shaft 18 and third element 170Y with the third variable power transmission clutch 176. In a second mode the third variable power transmission clutch 176 is disengaged and the fourth variable power transmission clutch 178 connects first summer element 170W to the second variable power unit 74 thus switching to an output summer configuration. Unit 72 is also connected to the input shaft 16 with second variable power transmission clutch 174 in the second mode and first clutch 172 is disengaged.

The particular gearing scheme would depend on the design of the variable power units 72 and 74 and on the input and output shaft spatial configuration. The switch from input to output summer at mode shift eliminates a power reversal in the units 72 and 74 and makes a low cost clutch possible while keeping a small battery in the vehicle.

Figure 12:
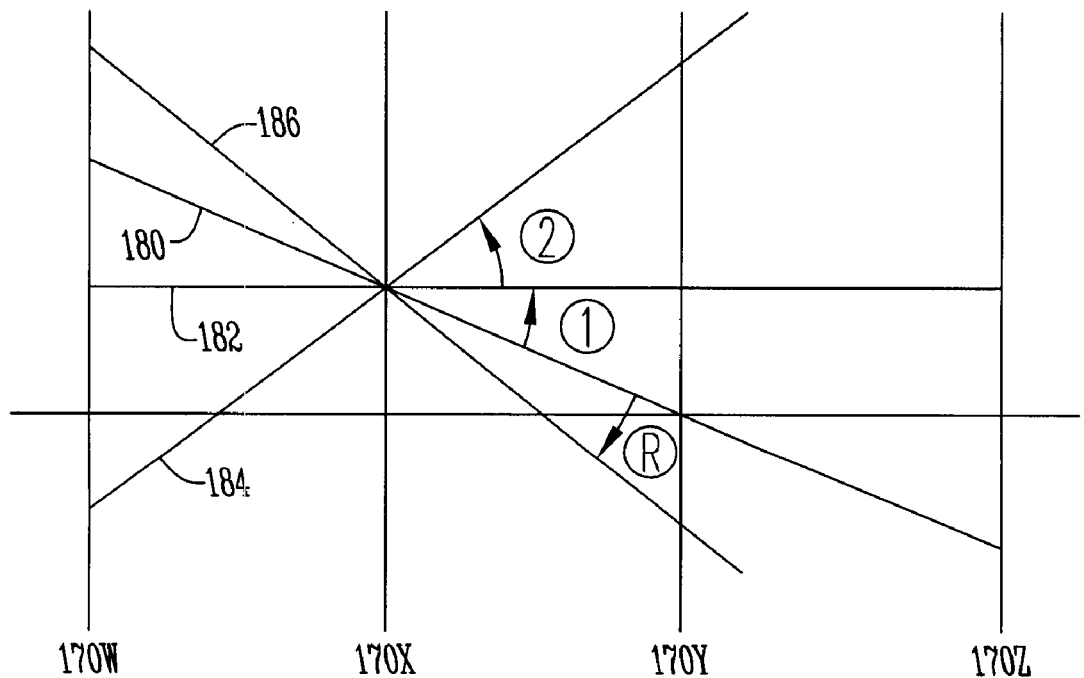
FIG. 12 is a speed diagram of a split-power transmission wherein the X axis is a planetary ratio and the vertical axes are speed.

The speed diagram for the split-power transmission shown in FIG. 11 is provided in FIG. 12. As shown by line 180, the first mode starts with element 170Y at zero speed, element 170X is at input shaft speed and element 170Z is at a negative speed. When controller 22 causes units 72 and 74 to change the ratio of the split-power transmission shown in FIG. 11 and drive forward, element 170Z reduces negative speed and then increases speed positively causing element 170Y to increase speed. As shown by line 182, a complete speed direction change of element 170Z raises element 170Y to near input shaft speed. The second mode is engaged with second and fourth variable power transmission clutches 174 and 178 by changing unit 74 from element 170Y to element 170W and unit 72 from element 170Z to 170X at a synchronous speed. This allows a further increase in output shaft speed up to line 184 by reversing the speed change of unit 74 with element 170W. Maximum reverse speed is thus represented by line 186 when the first and third variable power transmission clutches 172 and 176 are engaged.

Figure 13:
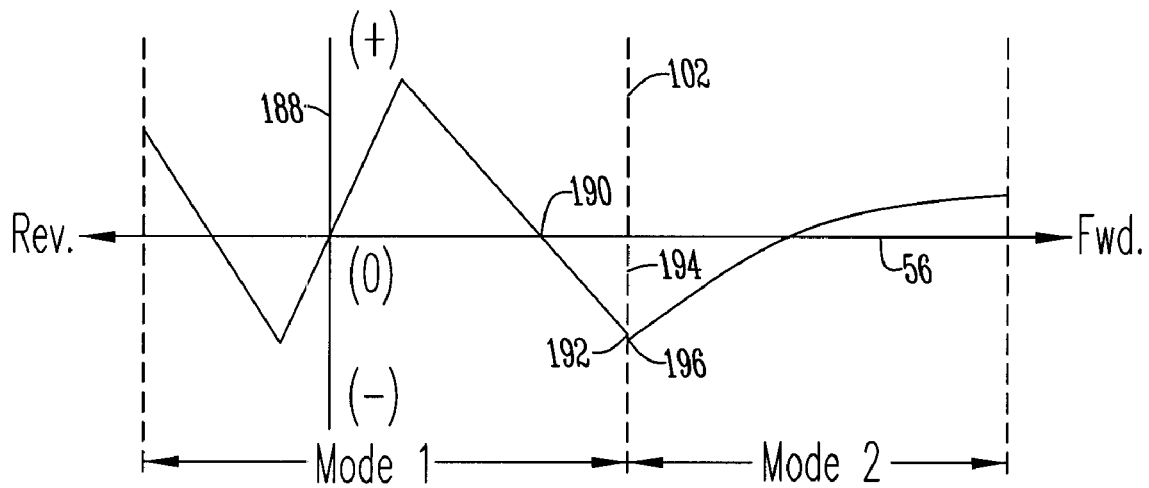
FIG. 13 is a unit power graph for a split-power transmission wherein the X axis is output speed and the Y axis is the electrical power in variable power units.

FIG. 13 is a graph that shows electrical power 188 in units 72 and 74 on a vertical axis versus the output shaft speed 56 shown on the horizontal axis. In operation, starting forward from zero speed, unit 72 acts as generator or pump supplying power to unit 74. Positive power flows from unit 72 to unit 74 in the direction of engine power delivery to output shaft 18 through third variable power transmission clutch 176. Power is also delivered to output shaft 18 by planetary element 170Y, and is additive to the power provided by unit 74. As the output shaft 18 increases speed, unit 72 decreases speed and reverses direction. This is shown as point 190 in FIG. 13. Near zero speed for unit 72, unit 74 becomes a generator or pump and beyond zero speed unit 72 becomes a motor. With unit 72 at negative speed, power flows in the opposite direction of the engine and recirculates through summer 170. This is shown as negative power between points 190 and 192. Point 192 at line 194 is the shift point between the first and second modes. There may be a slight change in unit transmitted power level after the shift as shown by point 196.

The gear arrangement provides for synchronous speed of clutches 178 and 174 near the shift point 192. After shift, the speed of unit 72 is engine driven and remains the same. Meanwhile, unit 74 decreases speed after the shift, stops, and then increases speed negatively as output shaft speed increases.

Because of the change in the function of the power summer 170, the units 72 and 74 do not reverse their direction of power flow after the shift. Thus unit 74 remains a generator or pump and unit 72 a motor. This is shown graphically in FIG. 14 at point 192. Because there is no change of unit 72 and 74 function, there is not a need to account for a change in electrical slip. Neither unit 72 or 74 is required to make a speed increase during the shift in order to maintain continuous power delivery. The shift may be synchronous and the clutches 172, 174, 176 and 178 may be sized for low cost such as mechanical dog clutches.

Figure 14:
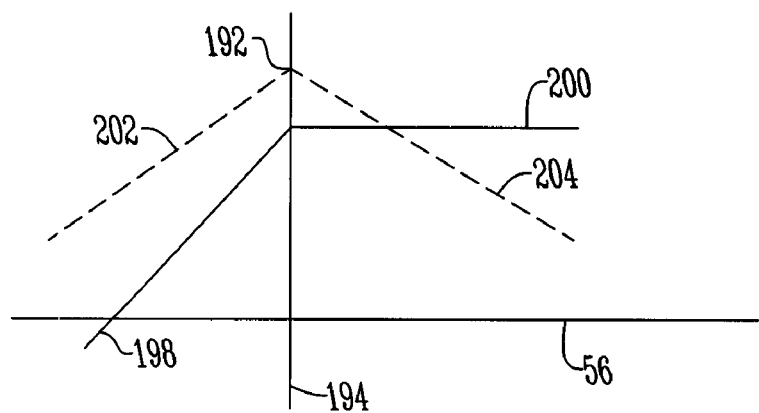
FIG. 14 is a graph of unit speed of a two mode split-power transmission wherein the horizontal axis represents output speed and the vertical axis represents unit speed.

On FIG. 14, line 194 is at the shift speed. The speed of unit 72 before the shift is represented by line 198, and the speed of the unit 72 after the shift is represented by line 200. The speed of unit 74 is represented by line 202 before shift and line 204 after shift. When clutches 174 and 178 are engaged synchronously, no speed shift occurs and unit 72 and 74 remain a motor and generator, respectively. This may be observed because unit 72 continues to increase speed relative to unit 74 after the mode shift. Therefore, units 72 and 74 remain in a closed circuit without external power, and without exceeding voltage or current limits.

Reverse speed is achieved by reversing the direction of current to unit 74 with the controller 22. This causes the output shaft 18 to rotate in the opposite direction. At this time unit 72 functions as a generator or pump and unit 74 functions as a motor that turns in the opposite direction from that in forward. Continuous power is delivered from the engine 12 to the wheels, with continuous ratio change, from full reverse to full forward speed. Other functions are accomplished as in the split-power transmissions 14 shown in FIGS. 3 and 7.

Figure 15:
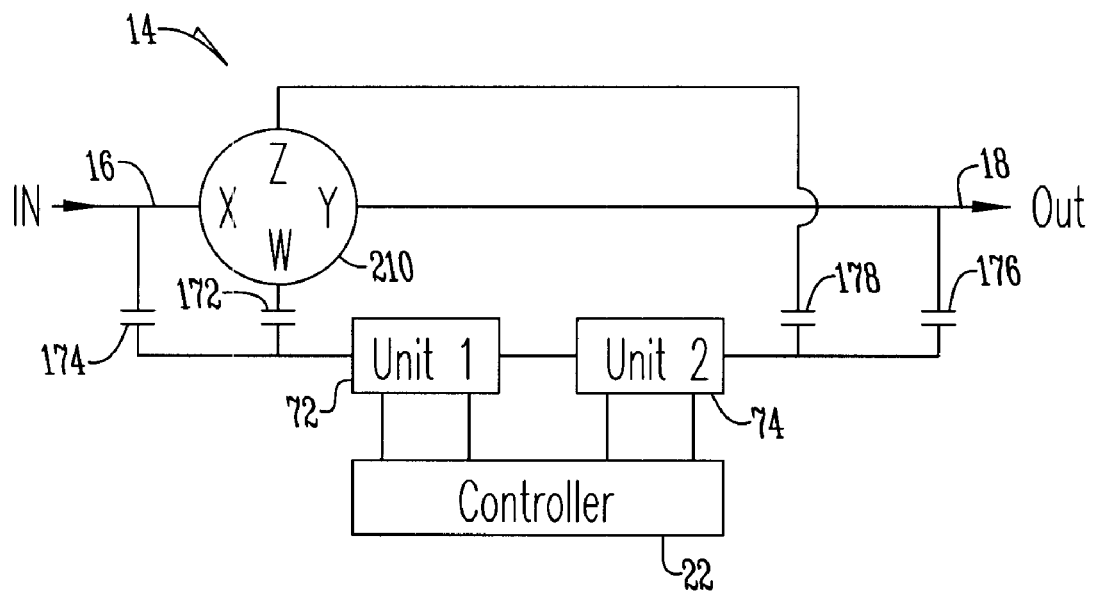
FIG. 15 is a schematic block diagram of a split-power transmission.

FIG. 15 shows a block diagram of yet another alternative embodiment of split power transmission 14. In this embodiment, split-power transmission 14 is a two mode split power transmission with a power summer 210 that switches from output summer to input summer when changing from a first mode to a second mode. Summer 210 in a preferred embodiment is a gear planetary having four elements 210W, 210X, 210Y, and 210Z. In this embodiment the transmission is set up identically as in the embodiment seen in FIG. 11 having first, second, third and fourth variable power transmission clutches 172, 174, 176 and 178 working in association with first and second variable power units 72 and 74 wherein the controller regulates the speed of units 72 and 74 and operates the clutches 172, 174, 176 and 178. In this embodiment, however, the first summer element 210W and the fourth summer element 210Z are reversed in clutched connections as compared to the embodiment shown in FIG. 11, and therefore, the sequence of clutch engagement is reversed.

Thus, in a first mode engine power enters the transmission at the input shaft 16 at second summer element 210X and through second variable power transmission clutch 174 to first variable power unit 72. Variable power unit 74 is connected to the fourth element 210Z with fourth variable power transmission clutch 178. Consequently, output shaft 18 is connected only to third element 210Y in the first mode, an output summer configuration. In a second mode, the fourth variable power transmission clutch 178 is disengaged and the third variable power transmission clutch 176 connects output shaft 18 and third element 210Y to second variable power unit 74. Unit 72 also is connected only to first element 210W with first variable power transmission clutch 172 in the second mode, thus switching to an input summer configuration.

The particular gearing scheme would, again, depend on the design of the unit 72 and 74 and on the spatial configuration of the input and output shafts 16 and 18. The switch from output to input summer at mode shifts eliminates a power reversal in the variable power units and makes a low cost clutch possible while keeping a small battery in the compact vehicle.

Figure 16:
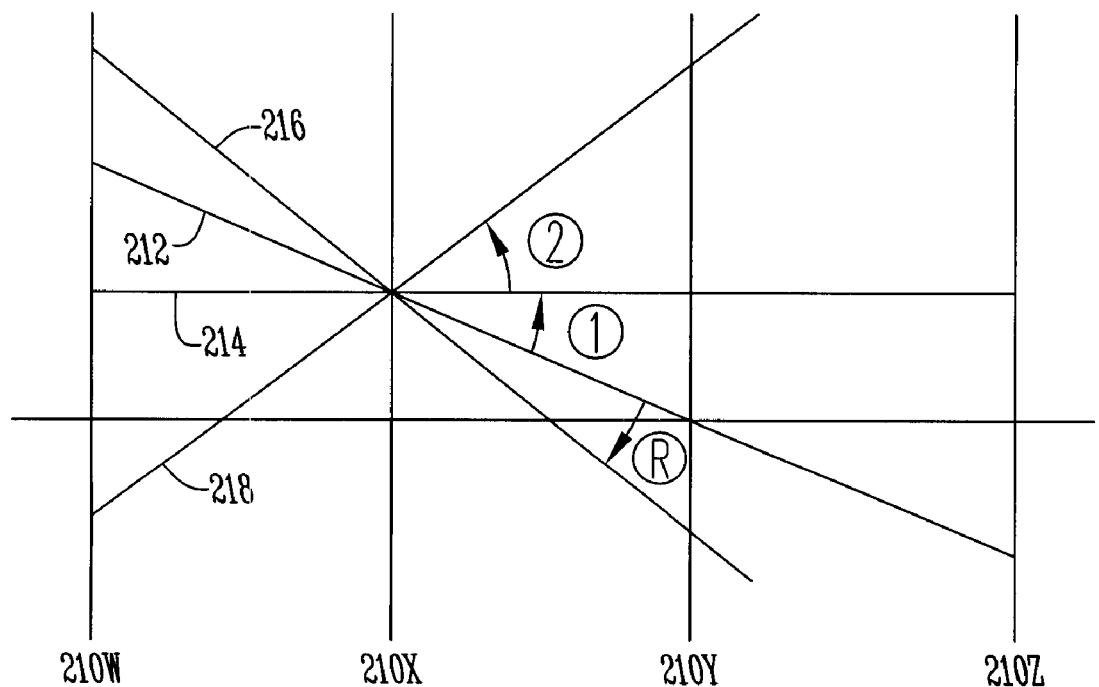
FIG. 16 is a speed diagram of a two mode power-split power transmission wherein the X axis represents a planetary ratio and the Y axis represents speed.

The speed diagram for split power transmission shown in FIG. 15 is provided in FIG. 16, and is identical to FIG. 12. As shown by line 212, the first mode starts with element 210Y at zero speed, element 210X is at input shaft speed and element 210Z is negative speed. When the controller 22 causes units 72 and 74 to change the ratio of the split-power transmission shown in FIG. 15 and drive forward, element 210Z reduces negative speed and then increases speed positively causing element 210Y to increase speed. As shown by line 214, a complete speed direction change of element 210Z raises element 210Y to near input shaft speed. The second mode is engaged with clutches 172 and 176 by changing unit 74 from element 210Z to element 210Y, and unit 72 from element 210X to 210W at a synchronous speed. This allows a further increase in output shaft speed up to line 218 by causing a speed reduction of element 210W. Thus maximum reverse speed is represented by line 216 when the clutches 174 and 178 are engaged.

Figure 17:
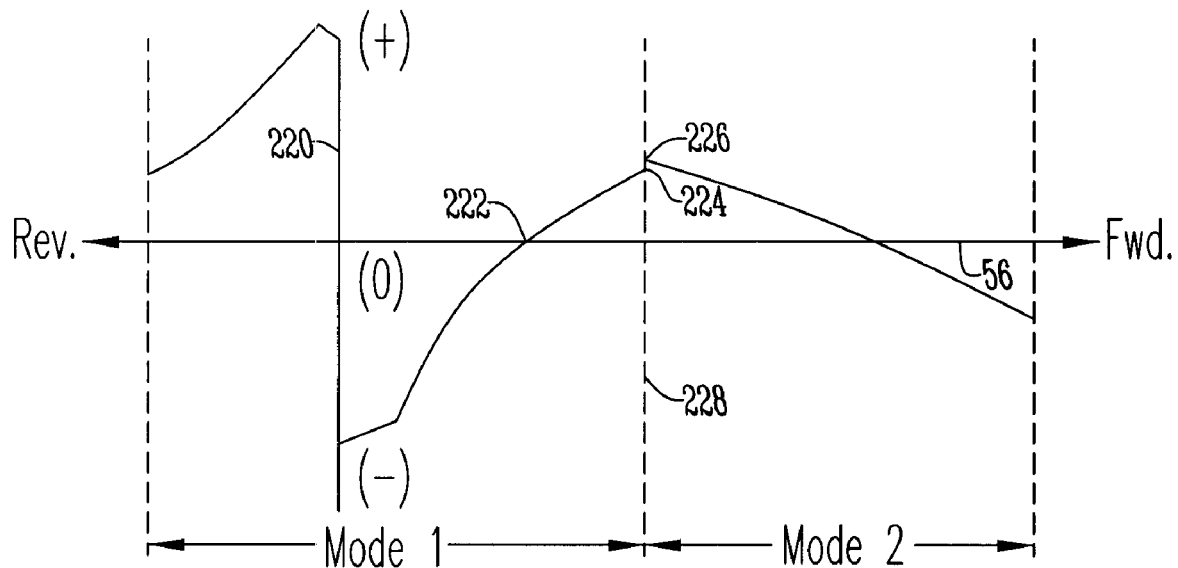
FIG. 17 is a power graph of a split-power transmission wherein the X axis represents output speed and the Y axis represents transmitted power in variable power units.

FIG. 17 shows a graph with transmitted power 220 in units 72 and 74 represented by the vertical axis versus the output shaft speed 56 represented on the horizontal axis. In operation, starting forward from zero speed, unit 74 operates as a generator or pump supplying power to unit 72. Negative power flows from unit 74 to unit 72 in the opposite direction of engine power. Power is then delivered to output shaft 18 by planetary element 210Y. As the output shaft increases speed, unit 74 decreases speed and reverses direction. This reversal is shown as point 222 in FIG. 18. Near zero speed for unit 74, unit 74 operates as a generator or pump and beyond zero speed unit 74 operates as a motor. With unit 74 at positive speed, power flows in the same direction of the engine. This power flow is shown as positive power between points 222 and 224. Point 224 is thus considered the shift point between the first and second modes. There may be a slight change in unit transmitted power level after the shift as shown by point 226.

The gear arrangement provides for synchronous speed of clutches 172 and 176 near the shift point 224. After shift, the speed of unit 74 is output driven and continues to increase. The speed of unit 72 decreases after the shift, stops and then increases speed negatively as output shaft speed increases.

Because of the change in the function of the power summer 210, the units 72 and 74 do not reverse their direction of power flow after the shift. Thus, unit 72 remains a generator or pump and unit 74 a motor. This is shown graphically in FIG. 18 at point 224. Because there is no change of unit 72 and 74 function, there is not a need to account for a change in electrical slip. Neither unit 72 or 74 is required to make a speed increase during the shift in order to maintain continuous power delivery. The shift may be synchronous and the clutches 172, 174, 176 and 178 may be low cost such as mechanical dog clutches.

Figure 18:
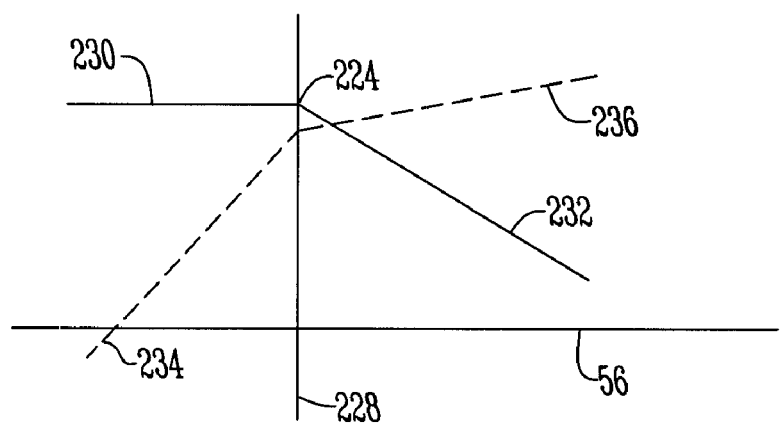
FIG. 18 is a speed graph for a split-power transmission wherein the X axis represents output speed and the Y axis represents unit speed.

On FIG. 18, line 228 is at the shift speed. The speed of the unit 72 before the shift is represented by line 230 and after the shift is represented by line 232. Meanwhile the speed of unit 74 before the shift is represented by line 234 and the speed of the unit 74 after the shift is represented by line 236. When clutches 172 and 176 are engaged synchronously, no speed shift occurs and unit 72 and 74 remain a generator and motor, respectively. This may be observed because unit 72 continues to decrease speed relative to unit 74 after the mode shift. Consequently, units 72 and 74 remain in a closed circuit without external electrical power, and without exceeding voltage or current limits.

Reverse speed is achieved by reversing the direction of current or displacement to unit 74 with controller 22. This causes the output shaft 18 to rotate in the opposite direction.

Unit 74 operates as a generator or pump turning in the opposite direction from that in forward and unit 72 operates as a motor. Continuous power is delivered from the engine to the wheels, with continuous ratio change, from full reverse to full forward speed. Other functions are accomplished as described regarding the split-power transmission shown in FIG. 11.

The split-power transmissions shown in FIGS. 11 and 15 have similar block diagrams and speed diagrams. This means that both transmissions could be achieved with the same hardware design if the connections to element 170W, 210W and 170Z, 210Z were designed to be interchanged. The reversal of the clutch engagement sequence may be accommodated with controller 22 software design. With the symmetrical speed diagram shown in FIGS. 12 and 16, the split-power transmissions of FIGS. 11 and 15 could also be achieved with the same hardware design by interchanging elements 170X, 210X and 170Y, 210Y.

The choice of any of the split-power transmissions described may depend on how the power flows in the transmission match up to the duty cycle of the vehicle. Typically, recirculating power in the transmission is less efficient and lower life than non-recirculating power. The length of time and the power being delivered at various vehicle speeds would be considered. In either case, the vehicle has a continuous speed ratio from maximum reverse speed to maximum forward speed with any of the transmissions.

The same block diagrams and speed diagrams shown in FIGS. 3-4, 7-8, 11-12, and 15-16 may be applied to split power transmissions having either electrical or hydrostatic units for the variable power delivery portion. The power flows and unit speeds before and after shift would be similar, as in FIGS. 5-6, 9-10, 13-14 and 17-18.

Thus, the disclosed transmission provides a continuous ratio from full reverse to full forward speed. By providing a controlled output speed through zero, the transmission eliminates the need for any clutch between the engine 12 and the transmission 14. As shown above, the embodiments provided contemplate four approaches that vary the location of a power summing planetary 62, 120, 170, 210 and show transmissions with two forward modes. Furthermore, versions having a single forward mode or with three or more modes, could be used by altering the gear scheme and the sizing of the variable power units 72 and 74.

Additionally disclosed is a control system 22 that performs functions for controlling the transmission and vehicle. This includes controlling transmission ratio, modes shifts, engine fuel delivery, engine braking and providing the engine start and battery recharge functions. Thus, at the very least, all of the stated objective have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A split power transmission comprising:
    a power summing device;
    first and second variable power units connected to the power summing device;
    a first clutch connected to the first variable power unit;
    a second clutch connected to the second variable power unit;
    a controller electrically connected to the power summing device, the first and second clutches and the first and second variable units to shift between a first and second mode; and
wherein the power summing device provides for near synchronous speed of a clutch at a shift point.

2. The transmission of claim 1 wherein the controller deactuates the first clutch and actuates the second clutch to shift from the first mode to the second mode.

3. The transmission of claim 1 wherein the power summing device is an input summer having first, second, third and fourth elements wherein the first variable unit is connected to the first element, the second variable unit is connected to an output shaft and in the first mode the first clutch connects the output shaft and the second variable unit to the fourth element whereas in the second mode the second clutch connects the first element to the output shaft and second variable unit.

4. The transmission of claim 3 wherein the first element is a ring gear, the second element is a gear carrier, the third element provides an input speed and the fourth element is a sun gear, and the input summer is a gear planetary.

5. The transmission of claim 1 wherein the power summing device switches from an input summer to an output summer when the controller shifts between the first mode and the second mode.

6. The transmission of claim 5 wherein the power summing device is a gear planetary having first, second, third and fourth elements.

7. The transmission of claim 6 wherein in the first mode the first clutch is engaged and the second element receives an engine input shaft, the first variable unit is connected to the fourth element and the second variable unit is connected to an output shaft and third element whereas in the second mode the second clutch is engaged such that the first element is connected to the second variable power unit.

8. The transmission of claim 6 wherein in the second mode the first variable power unit is connected to the input shaft with a third clutch.

9. The transmission of claim 1 wherein the power summing device switches from an output summer to an input summer when the controller shifts between the first mode and second mode.

10. The transmission of claim 9 wherein the power summing device is a gear planetary having first, second, third and fourth elements.

11. The transmission of claim 10 wherein in the first mode an engine input shaft is connected to the second element and is connected to the first variable power unit via a third clutch, the second variable power unit is connected to the fourth element with the second clutch, and an output shaft is connected to the third element whereas in the second mode the first clutch is engaged to connect the output shaft and the third element to the second variable unit, and the first variable power unit is connected to the first element via a fourth clutch element.

12. The transmission of claim 2 wherein the power summing device is an output power summer.

13. The transmission of claim 12 wherein the output power summer is a gear planetary having first, second, third, and fourth elements wherein an output shaft is connected to the second element.

14. The transmission of claim 13 wherein in the first mode the first clutch connects the input shaft to the first element whereas in the second mode the second clutch connects the input shaft to the third element.

15. The transmission of claim 14 wherein the controller causes a shift into a third reverse mode wherein a reverse mode clutch is engaged.

16. The transmission of claim 1 wherein the first and second variable power units are electrical motor generators.

17. The transmission of claim 1 wherein the first and second variable power units are hydraulic pump motors.

18. The transmission of claim 1 wherein the variable power units operate in a closed circuit.

19. An operating system for a vehicle comprising:
  an engine;
  a split power transmission mechanically connected to the engine via an input shaft;
  an axle mechanically connected to the split power transmission via an output shaft;
  a controller electrically connected to the engine and split power transmission to receive a plurality of signals;
  wherein the split power transmission comprises a power summing device having a plurality of elements that when used with a plurality of clutches and plurality of variable power units provides a plurality of operating modes regulated by the controller;
  wherein the power summing device provides near synchronous speed of a clutch at a shift point.

* * * * *